United States Patent
Nogami et al.

(10) Patent No.: US 10,359,320 B2
(45) Date of Patent: Jul. 23, 2019

(54) METHOD OF MEASURING A TEMPERATURE OF A HEAT PLATE AND METHOD THEREOF

(71) Applicant: TOKYO ELECTRON LIMITED, Tokyo (JP)

(72) Inventors: Tsuyoshi Nogami, Koshi (JP); Masahiro Nakaharada, Koshi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 109 days.

(21) Appl. No.: 15/428,818

(22) Filed: Feb. 9, 2017

(65) Prior Publication Data

US 2017/0234737 A1    Aug. 17, 2017

(30) Foreign Application Priority Data

Feb. 16, 2016  (JP) .................................. 2016-027096

(51) Int. Cl.
  *G01K 3/06* (2006.01)
  *G01K 13/00* (2006.01)
  *G01K 15/00* (2006.01)

(52) U.S. Cl.
  CPC ............... *G01K 3/06* (2013.01); *G01K 13/00* (2013.01); *G01K 15/005* (2013.01)

(58) Field of Classification Search
  CPC ...................................................... G01K 3/06
  See application file for complete search history.

(56) References Cited

U.S. PATENT DOCUMENTS

| 6,191,394 B1* | 2/2001 | Shirakawa | H01L 21/67103 118/724 |
| 7,868,270 B2* | 1/2011 | Ookura | H01L 21/67178 219/444.1 |
| 2003/0183613 A1* | 10/2003 | Takano | H01L 21/67248 219/390 |

(Continued)

FOREIGN PATENT DOCUMENTS

| JP | 9-189613 A | 7/1997 |
| JP | 2003-77816 A | 3/2003 |

*Primary Examiner* — Manuel L Barbee
*Assistant Examiner* — Raymond L Nimox
(74) *Attorney, Agent, or Firm* — Nath, Goldberg & Meyer; Jerald L. Meyer

(57) ABSTRACT

A device that measures a temperature of a heat plate for heating a target substrate mounted thereon, includes: a temperature measurement substrate including a substrate body and temperature sensors installed in the substrate body; a memory part to store correction parameters over a plurality of time zones after the temperature measurement substrate is mounted on the heat plate; and a data processing part configured to acquire time transition data of a temperature by correcting respective temperature detection values sampled at predetermined time intervals after the temperature measurement substrate is mounted on the heat plate, using the correction parameters stored in the memory part in a corresponding relationship with the temperature sensors and the time zones. The correction parameters are obtained in advance based on a standard temperature transition data acquired in advance using the temperature sensors and a time transition data acquired by each of the temperature sensors.

6 Claims, 13 Drawing Sheets

(56) References Cited

U.S. PATENT DOCUMENTS

| | | | | |
|---|---|---|---|---|
| 2008/0142500 A1* | 6/2008 | Tomita | ............. | H01L 21/67109 |
| | | | | 219/444.1 |
| 2008/0156785 A1* | 7/2008 | Ookura | ............. | H01L 21/67248 |
| | | | | 219/162 |
| 2009/0254226 A1* | 10/2009 | Iwanaga | ........... | H01L 21/67103 |
| | | | | 700/300 |

* cited by examiner

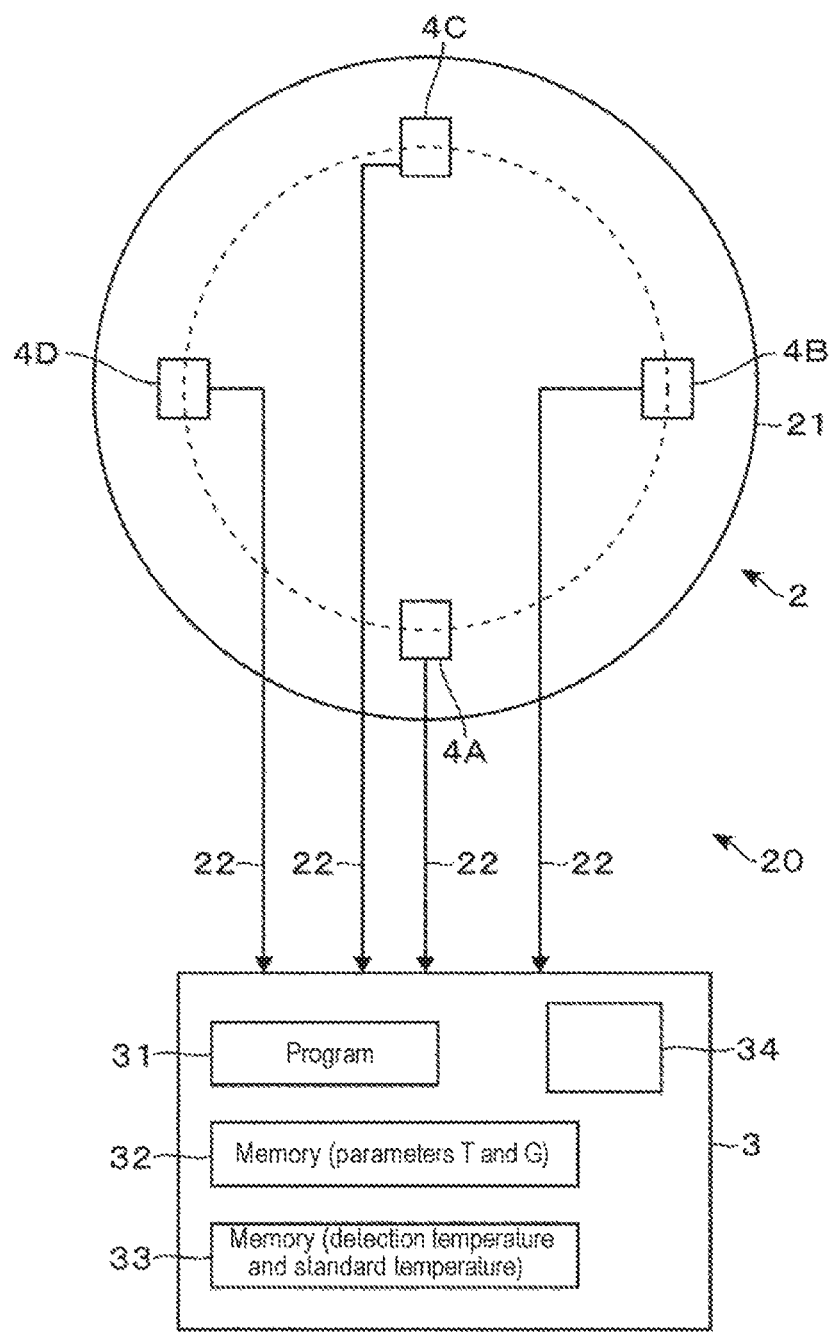

FIG. 3

Temperature sensor 4A

| Signal sampling time | t0 | t1 | t2 | t3 | t4 | --- | tn-1 | tn |
|---|---|---|---|---|---|---|---|---|
| Period | | $\Delta t_1$ | $\Delta t_2$ | $\Delta t_3$ | $\Delta t_4$ | ------ | | $\Delta t_n$ |
| Parameter T | | A11 | A12 | A13 | A14 | ------ | | A1n |
| Parameter G | | A21 | A22 | A23 | A24 | ------ | | A2n |

Temperature sensor 4B

| Signal sampling time | t0 | t1 | t2 | t3 | t4 | --- | tn-1 | tn |
|---|---|---|---|---|---|---|---|---|
| Period | | $\Delta t_1$ | $\Delta t_2$ | $\Delta t_3$ | $\Delta t_4$ | ------ | | $\Delta t_n$ |
| Parameter T | | B11 | B12 | B13 | B14 | ------ | | B1n |
| Parameter G | | B21 | B22 | B23 | B24 | ------ | | B2n |

Temperature sensor 4C

| Signal sampling time | t0 | t1 | t2 | t3 | t4 | --- | tn-1 | tn |
|---|---|---|---|---|---|---|---|---|
| Period | | $\Delta t_1$ | $\Delta t_2$ | $\Delta t_3$ | $\Delta t_4$ | ------ | | $\Delta t_n$ |
| Parameter T | | C11 | C12 | C13 | C14 | ------ | | C1n |
| Parameter G | | C21 | C22 | C23 | C24 | ------ | | C2n |

Temperature sensor 4D

| Signal sampling time | t0 | t1 | t2 | t3 | t4 | --- | tn-1 | tn |
|---|---|---|---|---|---|---|---|---|
| Period | | $\Delta t_1$ | $\Delta t_2$ | $\Delta t_3$ | $\Delta t_4$ | ------ | | $\Delta t_n$ |
| Parameter T | | D11 | D12 | D13 | D14 | ------ | | D1n |
| Parameter G | | D21 | D22 | D23 | D24 | ------ | | D2n |

Time transition data of detection temperature

Temperature sensor 4A

| Signal sampling time | t0 | t1 | t2 | t3 | t4 | --- | tn |
|---|---|---|---|---|---|---|---|
| Detection temperature | e10 | e11 | e12 | e13 | e14 | --- | e1n |

Temperature sensor 4B

| Signal sampling time | t0 | t1 | t2 | t3 | t4 | --- | tn |
|---|---|---|---|---|---|---|---|
| Detection temperature | e20 | e21 | e22 | e23 | e24 | --- | e2n |

Temperature sensor 4C

| Signal sampling time | t0 | t1 | t2 | t3 | t4 | --- | tn |
|---|---|---|---|---|---|---|---|
| Detection temperature | e30 | e31 | e32 | e33 | e34 | --- | e3n |

Temperature sensor 4D

| Signal sampling time | t0 | t1 | t2 | t3 | t4 | --- | tn |
|---|---|---|---|---|---|---|---|
| Detection temperature | e40 | e41 | e42 | e43 | e44 | --- | e4n |

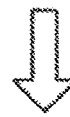 Extracting highest temperature at each time

Time transition data of standard temperature

| Signal sampling time | t0 | t1 | t2 | t3 | t4 | --- | tn |
|---|---|---|---|---|---|---|---|
| Detection temperature | e20 | e41 | e12 | e22 | e34 | --- | e3n |

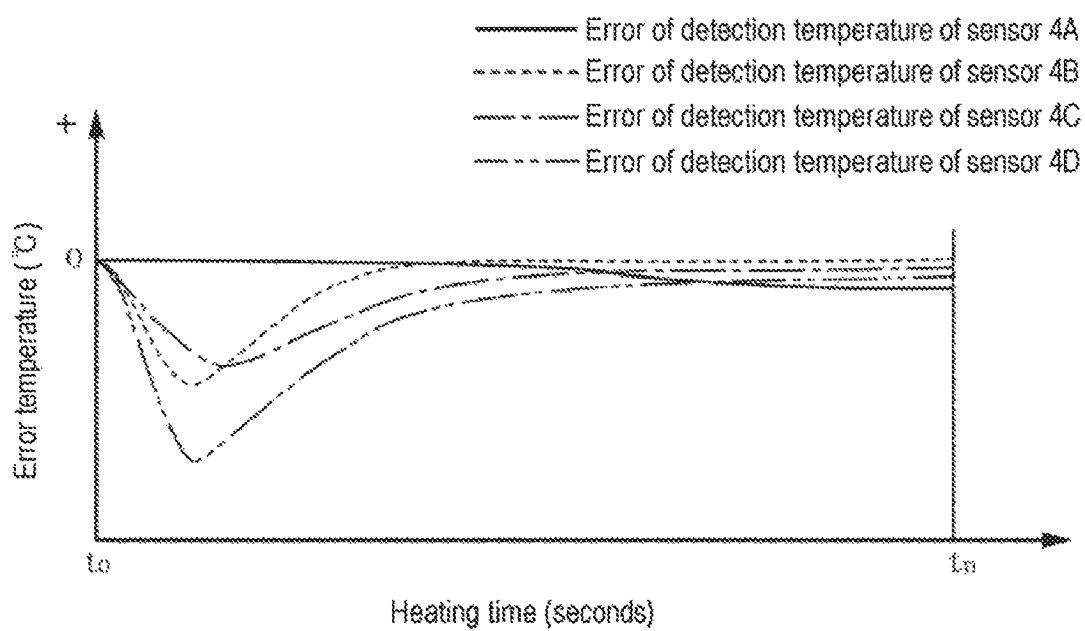

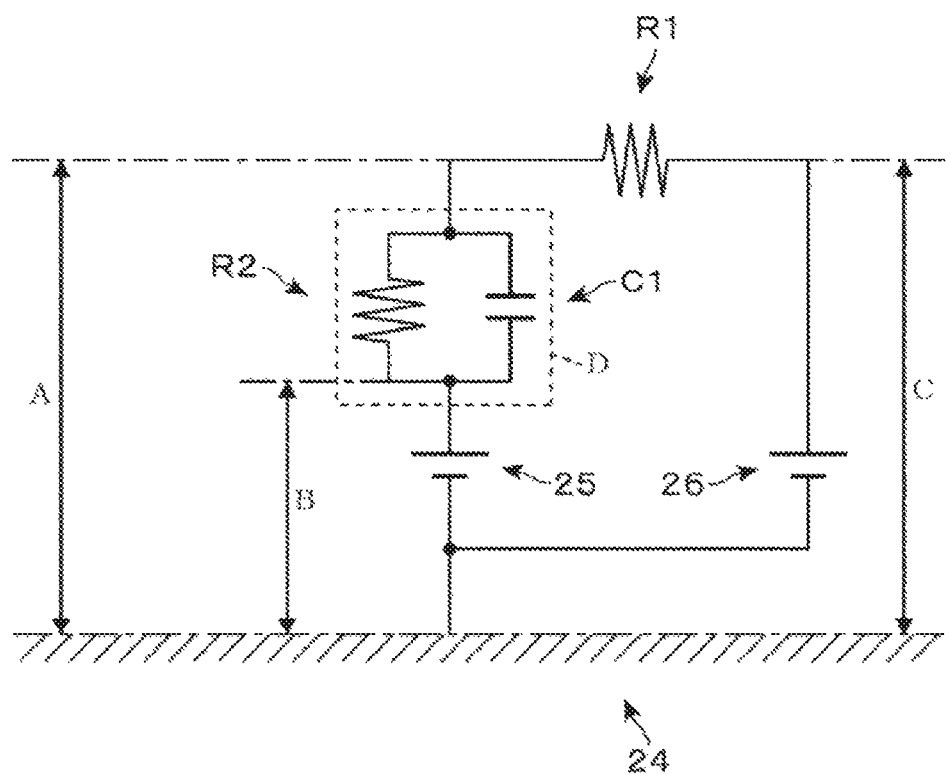

METHOD OF MEASURING A TEMPERATURE OF A HEAT PLATE AND METHOD THEREOF

CROSS-REFERENCE TO RELATED APPLICATION

This application claims the benefit of Japanese Patent Application No. 2016-027096, filed on Feb. 16, 2016, in the Japan Patent Office, the disclosure of which is incorporated herein in its entirety by reference.

TECHNICAL FIELD

The present disclosure relates to a temperature measurement device and a temperature measurement method, which measure a temperature of a heat plate configured to heat a target substrate mounted thereon.

BACKGROUND

In a photolithography process of a semiconductor manufacturing process, a semiconductor wafer (hereinafter referred to as a "wafer") as a target substrate is mounted on a heat plate and is subjected to a heat treatment. As an example of the heat treatment, there is a heat treatment (PEB: post-exposure bake) which is performed after a resist film formed on a wafer is exposed along a predetermined pattern and before development is performed. The shape of a resist pattern formed on a wafer in a photolithography process depends on various factors. One of the factors is a temperature of a wafer in the PEB. In the PEB, the uniformity of a treatment in respective portions within a plane of a wafer is required.

In order to inspect or adjust the heat plate, a temperature measurement wafer including a substrate body and a plurality of temperature sensors installed in the substrate body is mounted on the heat plate and a time transition data of temperatures of the substrate body measured by the respective temperature sensors are acquired. Since the temperature of the substrate body corresponds to the temperature of the heat plate, it is possible to perform the inspection and adjustment of the heat plate based on the time transition data of the temperature thus acquired. Describing the configuration of the temperature measurement wafer, output signals of the respective temperature sensors are transmitted to a measurement unit, which is coupled to the temperature measurement wafer, through, for example, a conductor such as a pattern or wires formed in the substrate body, and are defined as temperature values. Thus, the time transition data of the temperature are obtained.

The temperature measurement wafer is subjected to calibration (graduation) before it is used. Similar to the calibration of a typical thermometer, this calibration is performed by, for example, accommodating a temperature measurement wafer as a calibration target instrument in a thermostatic bath whose atmosphere is stirred into a soaking space, and comparing the temperature measured by each temperature sensor of the temperature measurement wafer with a measurement temperature (standard temperature) indicated by a standard thermometer as a standard instrument.

However, the calibration of an instrument is performed for the purpose of defining the relationship between a measurement value indicated by the measurement target instrument and a measurement value (standard value) indicated by a standard instrument under a specific condition and correcting a deviation of the measurement value of the measurement target instrument with respect to the standard value. The calibration does not necessarily assure the accuracy in the case where the measurement target instrument is used under a condition differing from the condition under which the calibration is performed. In other words, the environment in which the temperature measurement wafer is used differs usually from the environment in which calibration is performed. For example, the temperature measurement wafer is used in the environment in which a temperature gradient exists rather than the environment in which the aforementioned soaking space is formed.

If the environment in which the temperature measurement wafer is used differs from the environment in which calibration is performed, there may be a case where a measurement error is generated between the temperature measured by the temperature sensors and the temperature of the heat plate. Such a measurement error differs for each temperature sensor due to various kinds of factors such as a difference in thermal resistance between the surface of the substrate body and each of the temperature sensors, a difference in heat dissipation through a wire connected to each of the temperature sensors and an individual difference in the shape of the temperature sensors.

In recent years, a resist pattern is required to become further finer. In a wafer heat treatment such as the aforementioned PEB or the like, it is required to accurately control temperatures of the respective portions within the plane of the wafer in the course ranging from the treatment start to the treatment end. In order to execute such control, it is necessary to suppress the aforementioned measurement error and to increase the accuracy of time transition data of a temperature acquired by the respective temperature sensors. In the related art, structures mounted on a substrate body that constitutes a temperature measurement wafer is reduced as much as possible and the adhesion of the wafer and the structures is enhanced, thereby attempting to reduce a measurement error. However, this technique is insufficient to remove the measurement error attributable to the various kinds of factors mentioned above. Furthermore, in the related art, there is proposed a method of removing a measurement error after measurement values measured by temperature sensors are stabilized. However, in the related art, there is not disclosed a method of removing a measurement error before measurement values measured by temperature sensors are stabilized.

SUMMARY

Some embodiments of the present disclosure provide a technique capable of accurately acquiring a time transition data of a temperature with temperature sensors, when a temperature measurement substrate manufactured by installing a plurality of temperature sensors on a substrate body is mounted on a heat plate for heating a target substrate mounted thereon.

According to one embodiment of the present disclosure, there is provided a device that measures a temperature of a heat plate configured to heat a target substrate mounted thereon, the device including: a temperature measurement substrate including a substrate body and a plurality of temperature sensors installed in the substrate body; a memory part to, for each of the plurality of temperature sensors, store correction parameters over a plurality of time zones after the temperature measurement substrate is mounted on the heat plate; and a data processing part configured to acquire time transition data of a temperature by correcting respective temperature detection values sampled at predetermined time intervals after the temperature measurement substrate is mounted on the heat plate, using the correction parameters stored in the memory part in a corresponding relationship with the plurality of temperature sensors and the plurality of time zones, wherein the correction parameters are obtained in advance based on a standard temperature transition data acquired in advance using the plurality of temperature sensors and a time transition data acquired by each of the plurality of temperature sensors.

According to another embodiment of the present disclosure, there is provided a method of measuring a temperature of a heat plate configured to heat a target substrate mounted thereon, including: mounting a temperature measurement substrate, which includes a substrate body and a plurality of temperature sensors installed in the substrate body, on the heat plate; acquiring, for each of the plurality of temperature sensors, correction parameters over a plurality of time zones after the temperature measurement substrate is mounted on the heat plate, based on a standard temperature transition data acquired using the plurality of temperature sensors and a time transition data acquired by each of the plurality of temperature sensors; and acquiring a time transition data of a temperature by correcting respective temperature detection values sampled at predetermined time intervals after the temperature measurement substrate is mounted on the heat plate, using the correction parameters corresponding to the plurality of temperature sensors and the plurality of time zones.

BRIEF DESCRIPTION OF THE DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

FIG. 2 is a configuration diagram of a temperature measurement device for measuring a temperature of the heat plate.

FIG. 3 is a schematic diagram of a memory installed in a measurement unit that constitutes the temperature measurement device.

FIG. 8 is a schematic diagram of another memory installed in the measurement unit.

FIG. 9 is a graph illustrating transitions of errors of detection temperatures acquired by the temperature measurement wafer with respect to a standard temperature.

FIG. 10 is a schematic diagram illustrating a heat circuit formed of a heat plate and a temperature measurement wafer.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Figure 1:
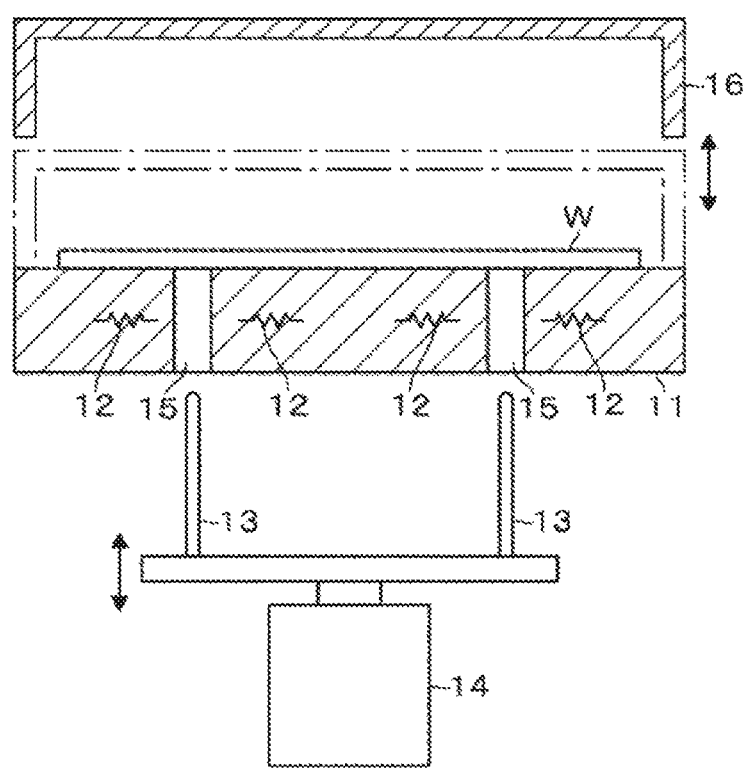
FIG. 1 is a vertical sectional side view of a heat plate that constitutes a heating module.

In FIG. 1, reference numeral 11 designates a horizontal circular heat plate which includes heaters 12 disposed therein. The surface of the heat plate 11 is heated to a predetermined temperature by the heaters 12. In this state, a wafer W, which is a circular target substrate, is mounted on the surface of the heat plate 11 and is subjected to a heat treatment. The heat treatment is performed by increasing the temperature of the wafer W so as to reach a predetermined process temperature corresponding to the temperature of the surface of the heat plate 11 and then maintaining the wafer W at the process temperature.

The heat plate 11 constitutes a heating module configured to perform, for example, the PEB described in the background section of the present disclosure. In FIG. 1, reference numeral 13 designates three lift pins (only two of which are illustrated in FIG. 1) which are moved up and down by a drive mechanism 14. The lift pins 13 deliver the wafer W between a wafer transfer mechanism (not shown) and the heat plate 11. When starting the heat treatment, the lift pins 13 are moved down while supporting the wafer W, thereby mounting the wafer W on the heat plate 11. When terminating the heat treatment, the lift pins 13 push the wafer W upward so that the wafer W is moved away from the heat plate 11. In FIG. 1, reference numeral 15 designates lift pin penetration holes formed in the heat plate 11.

In FIG. 1, reference numeral 16 designates a cover. The cover 16 is configured to be moved up and down by an elevator mechanism (not shown) between a raised position indicated by a solid line and a lowered position indicated by a chain line. Furthermore, the cover 16 is provided with an exhaust port (not shown). When the wafer W is subjected to the heat treatment, the cover 16 is positioned at the lowered position to cover the surface of the heat plate 11 and to exhaust an atmosphere existing around the wafer W. When the heat treatment is not performed, the cover 16 is positioned at the raised position to enable the wafer W to be delivered between the wafer transfer mechanism and the lift pins 13.

A temperature measurement device 20 configured to measure the temperature of the heat plate 11 is shown in FIG. 2. The temperature measurement device 20 includes a temperature measurement wafer 2 as a temperature measurement substrate, and a measurement unit 3 as a data processing part. The temperature measurement wafer 2 includes a substrate body 21 and temperature sensors 4A to 4D. In order to measure the temperature of the heat plate 11, instead of the wafer W, the temperature measurement wafer 2 is mounted on the heat plate 11 and is subjected to a heat treatment. The heat treatment of the temperature measurement wafer 2 is performed in the same manner as the heat treatment of the wafer W. In other words, the output and heating time of the heaters 12 are set to remain the same in the heat treatment of the temperature measurement wafer 2 and in the heat treatment of the wafer W. The temperature measurement wafer 2 is heated to the process temperature described above.

For example, the substrate body 21 is formed in the same shape as the wafer W and is made of the same material as the wafer W. The temperature sensors 4A to 4D (collectively referred to sometimes as the temperature sensor 4) are installed on the surface of the substrate body 21 and are coupled to the measurement unit 3 via respective wires 22. The temperature sensors 4A to 4D are configured similarly to one another. The temperature sensors 4A to 4D transmit detection signals, which correspond to temperatures of points of the surface of the substrate body 21 where the temperature sensors 4A to 4D are installed, and to the measurement unit 3 via the respective wires 22. An in-plane temperature distribution of the substrate body 21 available after the substrate body 21 is subjected to the heat treatment so as to reach the process temperature corresponds to an in-plane temperature distribution of the heat plate 11. In other words, the temperature sensors 4A to 4D are sensors installed to measure temperatures of respective portions of the substrate body 21 by regarding the temperatures of the respective portions of the substrate body 21 as the temperatures of the respective portions of the heat plate 11.

The temperature sensors 4A to 4D are installed along the circumference of the substrate body 21 at regular intervals from a center point P of the substrate body 21. The circle indicated by a dot line in FIG. 2 is an imaginary circle centered at the point P and is shown to indicate the positional relationship of the temperature sensors 4A to 4D. The temperature sensors 4A to 4D, when seen from the point P, are disposed at an interval of 90 degrees and are installed in the order of 4A, 4B, 4C and 4D) in a counterclockwise direction.

The measurement unit 3 is formed of a computer. The measurement unit 3 calculates temperatures (detection temperatures) corresponding to the detection signals respectively outputted from the temperature sensors 4A to 4D. As described in the Background section of the present disclosure, there may be a case where errors are generated because the detection temperatures do not coincide with the actual temperatures of the points of the substrate body 21 where the temperature sensors 4A to 4D are installed. The errors differ between the temperature sensors 4A to 4D. The measurement unit 3 calculates corrected temperatures by correcting the detection temperatures respectively acquired by the temperature sensors 4A to 4D, using correction parameters individually set with respect to the temperature sensors 4A to 4D, so that the errors are eliminated, and prepares a time transition data of the corrected temperatures.

The measurement unit 3 includes a program 31. In the program 31, a step group is incorporated so as to perform the acquisition of the detection signals from the temperature sensors 4A to 4D, the preparation of the time transition data of the corrected temperatures and the calculation of the correction parameters (which will be described later). The program 31 is stored in a storage medium of the computer, such as, for example, a compact disc, a hard disk, a magneto-optical disk, a memory card or the like, and is installed in the measurement unit 3.

After the temperature measurement wafer 2 is mounted on the heat plate 11, sampling of the detection signals of the temperature sensors 4A to 4D is repeatedly performed at predetermined time intervals by the measurement unit 3. Assuming that time zones between the timings at which the preceding and following sampling operations are performed are sampling periods $\Delta t$, the correction parameters are set in a corresponding relationship with the respective sampling periods $\Delta t$. The correction parameters include an adjustment parameter T and an adjustment parameter G. The adjustment parameter T and the adjustment parameter G will be described later in detail.

The measurement unit 3 includes a memory 32. In the memory 32, the adjustment parameters T and G are stored in association with the respective sampling periods $\Delta t$ and the respective temperature sensors 4. FIG. 3 schematically illustrates the memory 32. As for the sampling periods $\Delta t$, a numerical value denoting a time-series order is affixed to the back of $\Delta t$. A character "n" in $\Delta t_n$ denotes an integer. The time at which the sampling is performed is denoted by t. A numerical value corresponding to the numerical value denoting the order, which is affixed to each of the sampling periods $\Delta t$, is affixed to the back of t. Specifically, a period between time $t_0$ and time $t_1$, a period between time $t_1$ and time $t_2$ . . . and a period between time $t_{n-1}$ to time $t_n$ are a sampling period $\Delta t_1$, a sampling period $\Delta t_2$ . . . and a sampling period $\Delta t_n$, respectively.

Time $t_0$ is the time at which the temperature measurement wafer 2 is mounted on the heat plate 11 and the heat treatment is started. Time $t_n$ is the time at which the temperature measurement wafer 2 is pushed upward from the heat plate 11 and the heat treatment is terminated. Thus, the time period from time $t_0$ to time $t_n$ is the heating time (treatment time) of the temperature measurement wafer 2. Furthermore, arbitrary successive sampling timings may be sometimes denoted by time $t_{k-1}$ and time $t_k$. An arbitrary period between time $t_{k-1}$ and time $t_k$ may be sometimes denoted by $\Delta t_k$. The k is an integer which meets an inequality $1 \le k \le n$.

As illustrated in FIG. 2, the measurement unit 3 includes a memory 33. In the memory 33, in order to determine the adjustment parameters T and G which will be described later, the detection temperatures acquired from the detection signals of the temperature sensors 4A to 4D at the respective sampling timings t are stored as a time transition data of the detection temperatures in association with the respective temperature sensors 4 and the respective sampling timings t. Furthermore, in the memory 33, the standard temperatures at the respective timings t determined from the detection temperatures as will be described later are stored as a time transition data of the standard temperatures. In FIG. 2, reference numeral 34 designates a display part formed of, for example, a monitor or the like. The display part 34 displays the time transition data of the corrected temperatures as will be described later.

Figure 4:
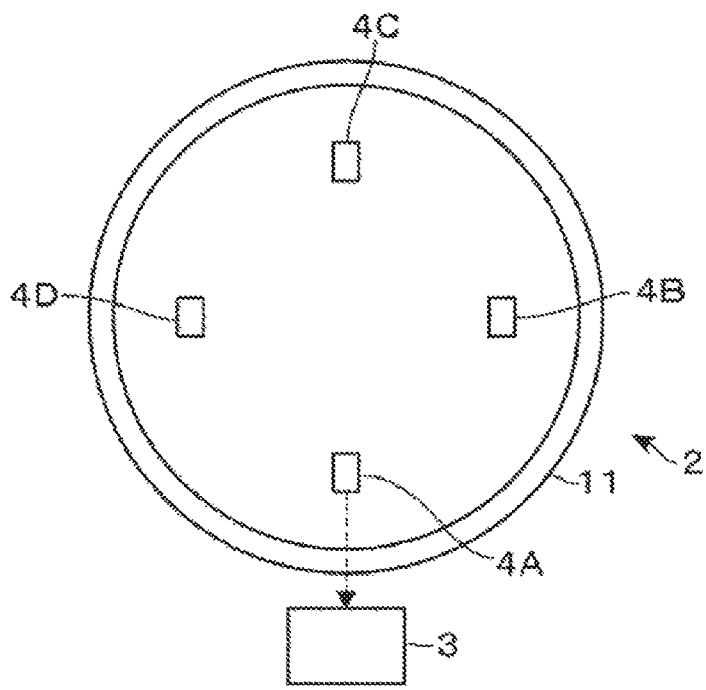
FIG. 4 is an explanatory view illustrating a state in which a temperature measurement wafer that constitutes the temperature measurement device is mounted on the heat plate.

Descriptions will now be made on a data acquisition procedure stored in the memory 33. First, as illustrated in FIG. 4, the temperature measurement wafer 2 is mounted on the heat plate 11 in an arbitrary orientation. As in the case of heat-treating the wafer W, the temperature measurement wafer 2 is subjected to a heat treatment. During this heat treatment, the detection signal of the temperature sensor 4A is sampled in a period Δt by the measurement unit 3, thereby acquiring detection temperatures at time $t_0$ to time $t_n$. This is defined as a first temperature detection.

Subsequently, after the temperature measurement wafer 2 is cooled down to, for example, room temperature, the temperature measurement wafer 2 is mounted on the heat plate 11 so that the orientation of the temperature measurement wafer 2 is shifted 90 degrees clockwise from the orientation available at the time of the first temperature detection. In this state, the temperature measurement wafer 2 is subjected to a heat treatment. During this heat treatment, the detection signal of the temperature sensor 4B is sampled in a period Δt by the measurement unit 3, thereby acquiring detection temperatures at time $t_0$ to time $t_n$. This is defined as a second temperature detection (see FIG. 5).

Then, after the temperature measurement wafer 2 is cooled down to, for example, room temperature, the temperature measurement wafer 2 is mounted on the heat plate 11 so that the orientation of the temperature measurement wafer 2 is shifted 90 degrees clockwise from the orientation available at the time of the second temperature detection. In this state, the temperature measurement wafer 2 is subjected to a heat treatment. During this heat treatment, the detection signal of the temperature sensor 4C is sampled in a period Δt by the measurement unit 3, thereby acquiring detection temperatures at time $t_0$ to time $t_n$. This is defined as a third temperature detection (see FIG. 6).

Thereafter, after the temperature measurement wafer 2 is cooled down to, for example, room temperature, the temperature measurement wafer 2 is mounted on the heat plate 11 so that the orientation of the temperature measurement wafer 2 is shifted 90 degrees clockwise from the orientation available at the time of the third temperature detection. In this state, the temperature measurement wafer 2 is subjected to a heat treatment. During this heat treatment, the detection signal of the temperature sensor 4D is sampled in a period Δt by the measurement unit 3, thereby acquiring detection temperatures at time $t_0$ to time $t_n$. This is defined as a fourth temperature detection (see FIG. 7).

The temperature sensor 4A at the time of the first temperature detection, the temperature sensor 4B at the time of the second temperature detection, the temperature sensor 4C at the time of the third temperature detection and the temperature sensor 4D at the time of the fourth temperature detection are respectively disposed at the same point on the heat plate 11. The detection temperatures at time $t_0$ to time $t_n$, namely the time transition data of the detection temperatures, are acquired from the temperature sensors 4A to 4D. The uppers side in FIG. 8 schematically illustrates the memory 33 in which the time transition data of the detection temperatures of the respective temperature sensors 4 acquired by performing the first to fourth temperature detections are stored.

As illustrated at the lower side in FIG. 8, at each of time $t_0$ to time $t_n$, the highest temperature is extracted as a standard temperature from the detection temperatures detected by the temperature sensors 4A to 4D and is stored as a time transition data of the standard temperature. Specifically, assuming that, at time $t_3$, the following relation "the detection temperature of the temperature sensor 4B>the detection temperature of the temperature sensor 4C>the detection temperature of the temperature sensor 4D>the detection temperature of the temperature sensor 4A" is established, the detection temperature detected by the temperature sensor 4B is set as the standard temperature at time $t_3$.

The standard temperatures thus set will be described with reference to FIGS. 9 and 10. FIG. 9 is a graph illustrating the transition of the errors (unit: degrees C.) of the detection temperatures detected by the temperature sensors 4A to 4D against the standard temperatures at time $t_0$ to time $t_n$. More specifically, each of the errors is a value calculated by subtracting the standard temperature from the detection temperature and is therefore a temperature of 0 degrees C. or less. The horizontal axis and the vertical axis in the graph indicate the heating time and the error, respectively. As described above, the temperature of the same point of the heat plate 11 is measured by the respective temperature sensors 4 and the standard temperature at each time t is set. Thus, as illustrated in the graph, the error of every moment is quantified. The adjustment parameters G and T mentioned above are set so as to cancel the error of every moment.

FIG. 10 is a view in which one of the temperature sensors 4A to 4D and the substrate body 21 mounted on the heat plate 11 are expressed as a heat circuit 24. The heat circuit 24 is essentially expressed as a circuit in which negative terminals of power sources 25 and 26 are grounded and a resistor R1 is installed between positive terminals of the power sources 25 and 26. However, in reality, due to the error factor, the heat circuit 24 has a circuit configuration in which a resistor R2 and a capacitor C1 parallel-connected to each other are interposed between the power source 25 and the resistor R1.

The error factor includes the heat dissipation of the wires 22 connected to the temperature measurement wafer 2 as described in the background section and the heat resistance of mutually-bonded bonding layers existing between the surface of the substrate body 21 constituting the temperature measurement wafer 2 and the respective temperature sensors 4A to 4D. Due to the existence of the error factor, the detection temperatures detected by the temperature sensors 4A to 4D=the ambient temperature of the temperature sensors 4A to 4D are lower than the temperature of the substrate body 21. Furthermore, the size of the resistor R2 and the capacitor C1, which is the error factor, differs at each time t and for each of the temperature sensors 4. As the influence of the error factor on the heat circuit 24 grows smaller, the detection temperatures detected by the temperature sensors 4A to 4D become larger so as to come close to the temperature of the substrate body 21. Thus, the highest temperature among the detection temperatures detected by the temperature sensors 4A to 4D at arbitrary time $t_k$ is a temperature closer to the temperature of the substrate body 21 at time $t_k$. For that reason, the highest temperature is set as the standard temperature at time $t_k$ as described above.

Figure 11:
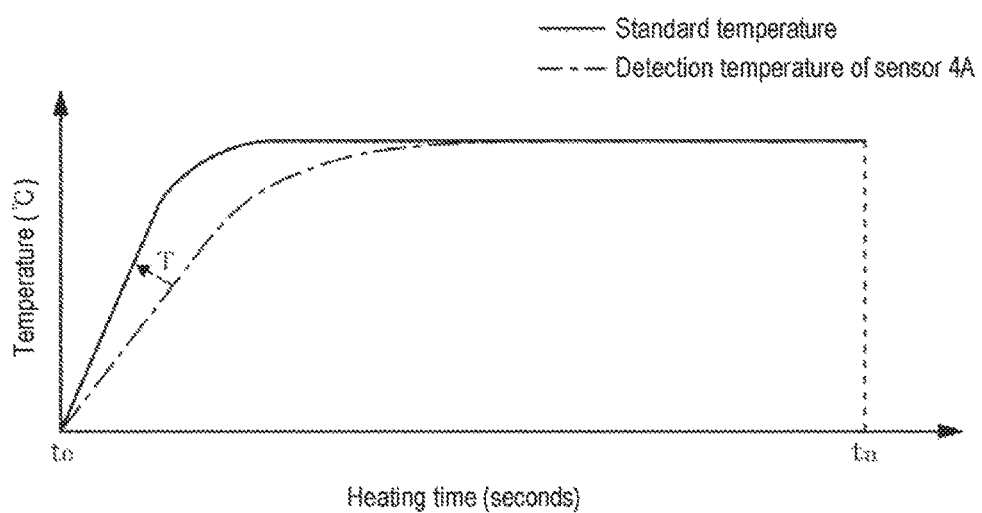
FIG. 11 is a graph illustrating a transition of a standard temperature and a transition of a detection temperature.
Figure 12:
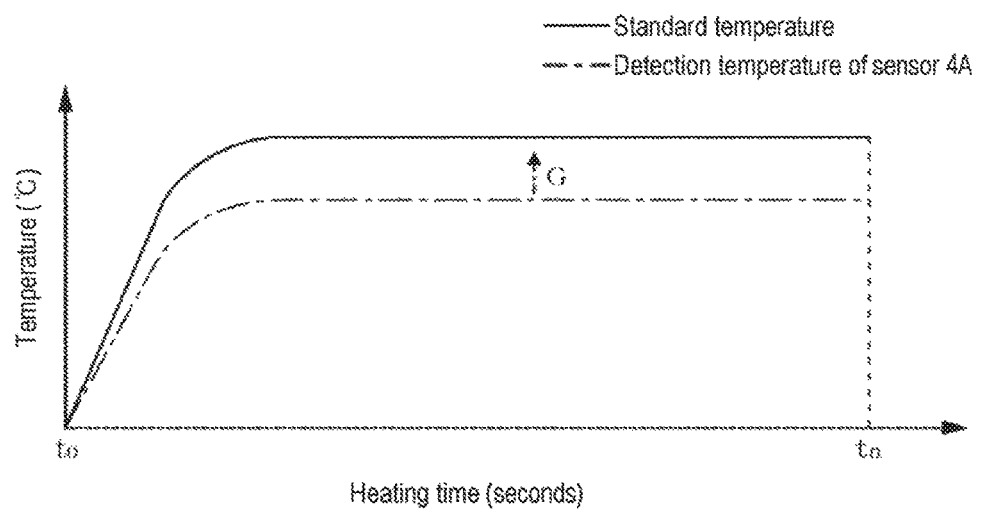
FIG. 12 is a graph illustrating a transition of a standard temperature and a transition of a detection temperature.

Next, the adjustment parameters T and G will be described with reference to FIGS. 11 and 12. In FIGS. 11 and 12, one example of a graph prepared from the time transition data of the standard temperature (hereinafter referred to as a standard temperature graph) is indicated by a solid line. Furthermore, in FIGS. 11 and 12, a graph prepared from the time transition data of the detection temperature detected by the temperature sensor 4A (hereinafter referred to as a detection temperature graph) is indicated by a chain line. For the sake of convenience in description, as for the detection temperature graph of the temperature sensor 4A, examples of different shapes are respectively shown in FIGS. 11 and 12. The horizontal axis in FIGS. 11 and 12 indicates the heating time (unit: seconds) and the vertical axis indicates the temperature (unit: degrees C.). In the standard temperature graph and the detection temperature graph, the time period during which the temperature remains stable, namely the time period during which the temperature becomes a process temperature, will be referred to as a stable period. A time period preceding the stable period, during which the temperature continues to increase, will be referred to as a transition period.

As described with reference to FIG. 9, the error of the detection temperature detected by the temperature sensor 4A against the standard temperature at arbitrary time $t_k$ is a temperature of 0 degrees C. or less. This indicates that, in the transition period, the transition of the detection temperature detected by the temperature sensor 4A may belatedly follow the transition of the standard temperature. In other words, in the transition period, time delay may be generated in the transition of the detection temperature of the temperature sensor 4A. The time delay corresponds to a difference between the slope of the standard temperature graph and the slope of the detection temperature graph. In FIG. 11, there is illustrated an example in which the time delay is relatively large and a relatively large difference exists between the slope of the standard temperature graph and the slope of the detection temperature graph.

Since the error of the detection temperature detected by the temperature sensor 4A against the standard temperature at arbitrary time $t_k$ is a temperature of 0 degrees C. or less, the detection temperature of the temperature sensor 4A in the stable period may be transited while keeping at a level lower than the standard temperature. In other words, a level difference in the reached process temperature may be generated between the detection temperature detected by the temperature sensor 4A and the standard temperature. In FIG. 12, there is illustrated an example in which the level difference exists.

The adjustment parameter T is a parameter for compensating the time delay. More specifically, the adjustment parameter T is a parameter for aligning the slope of the detection temperature graph in each period $\Delta t$ to the slope of the standard temperature graph. The adjustment parameter G is a parameter for compensating the level difference in the reached temperature. Thus, the adjustment parameter G is a parameter for adjusting an amplification factor, namely a gain. More specifically, the adjustment parameter G is a parameter for additionally correcting the detection temperature corrected by the adjustment parameter T and aligning the detection temperature to the standard temperature.

Figure 13:
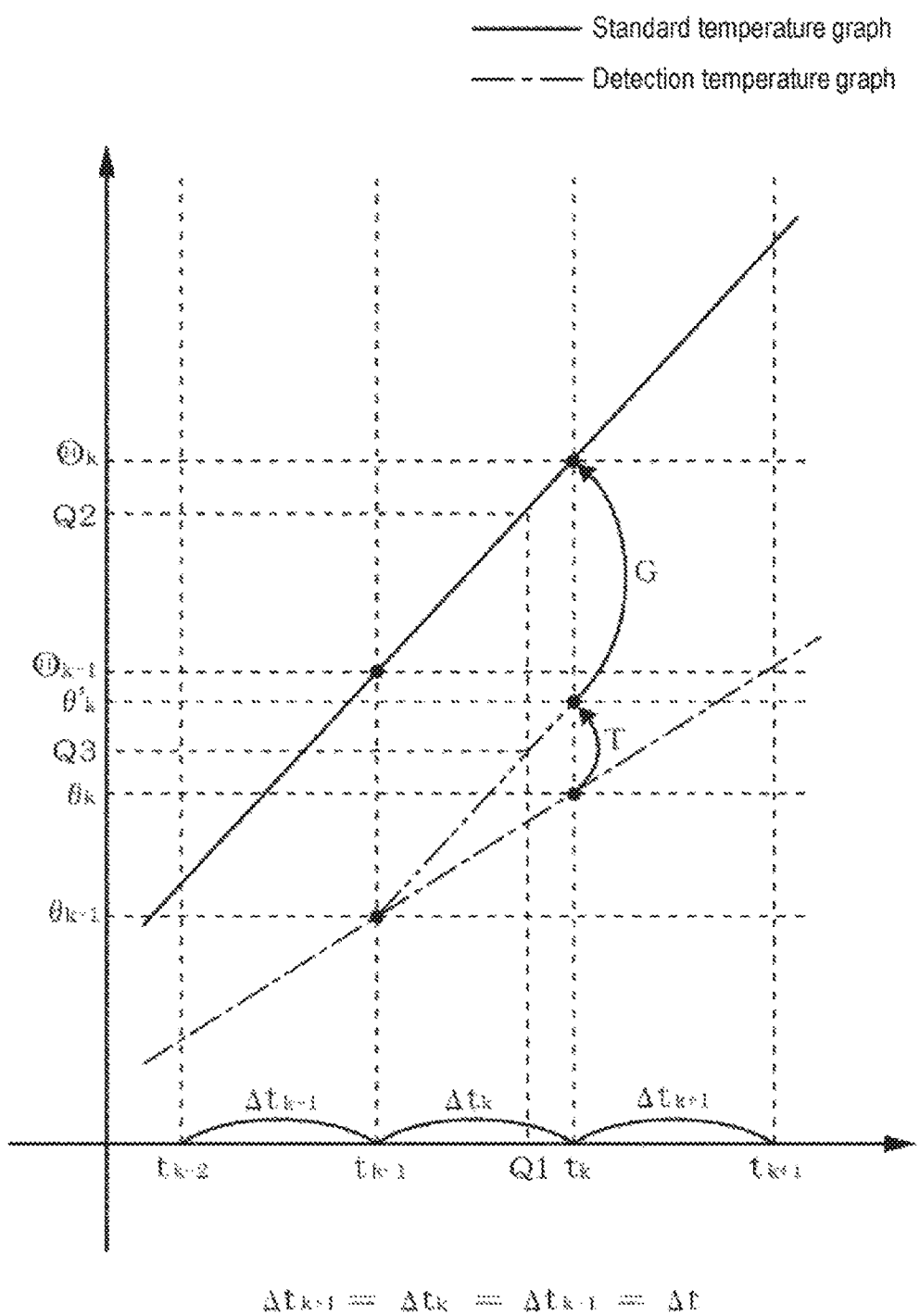
FIG. 13 is a graph illustrating an outline of correction of the detection temperature using a parameter.

Next, one example of a setting process of the adjustment parameters T and G during an arbitrary sampling time period $t_{k-1}$ to $t_k$ (period $\Delta t_k$), which is performed after setting the standard temperature, will be described with reference to a graph illustrated in FIG. 13. Similar to FIGS. 11 and 12, the graph of FIG. 13 illustrates the standard temperature graph and the detection temperature graph of the temperature sensor 4A with a solid line and a chain line, respectively. In the graph, the detection temperatures of the temperature sensor 4A at time $t_{k-1}$ and time $t_k$ are denoted by $\theta_{k-1}$ and $\theta_k$, respectively. In addition, the standard temperature at time $t_{k-1}$ and the standard temperature at time $t_k$ are denoted by $\Theta_{k-1}$ and $\Theta_k$, respectively.

The slope of the standard temperature graph in the period $\Delta t_k$ is $(\Theta_k - \Theta_{k-1})/\Delta t$ and the slope of the detection temperature graph is $(\theta_k - \theta_{k-1})/\Delta t$. Thus, for example, the adjustment parameter T in the period $\Delta t_k$ is calculated from the following formula (1).

$$\{(\theta_k - \theta_{k-1})/\Delta t\} \times T/\Delta t = (\Theta_k - \Theta_{k-1})/\Delta t \quad \text{Formula (1)}$$

Furthermore, if the detection temperature in the case of correcting the $\theta_k$ using the adjustment parameter T set in the period $\Delta t_k$ is denoted by $\theta'_k$ and if the detection temperature in the case of correcting the $\theta_{k-1}$ using the adjustment parameter T set in the period $\Delta t_{k-1}$ is denoted by $\theta'_{k-1}$, the following formula (2) is established between the $\theta'_k$ and the $\theta'_{k-1}$. The T in formula (2) is the T in the period $\Delta t_k$ of the foregoing formula (1). Thus, the $\theta'_k$ is calculated using the T calculated by formula (1). Subsequently, the adjustment parameter G in the period $\Delta t_k$ is calculated from the following formula (3).

$$\theta'_k = \{(T/\Delta t) \cdot (\theta_k - \theta_{k-1})\} + \theta'_{k-1} \quad \text{Formula (2)}$$

$$\Theta_k = G \cdot \theta'_k \quad \text{Formula (3)}$$

Specifically, as schematically illustrated in FIG. 13, the adjustment parameter T for correcting the detection temperature $\theta_k$ at the end time $t_k$ of the period $\Delta t_k$ is calculated so that the slope of the detection temperature graph in the period $\Delta t_k$ is aligned to the slope of the standard temperature graph. Then, the adjustment parameter G is calculated so as to cancel an error still remaining between the temperature $\theta'_k$ of the correction intermediate step obtained through the correction using the T and the standard temperature $\Theta_k$. In FIG. 13, for the purpose of schematically illustrating the actions of the parameters, there is shown that the $\theta'_{k-1}$ in formula (2) is $\theta_{k-1}$. Additional descriptions will be made on the $\theta'_{k-1}$. The $\theta'_{k-1}$ is a value calculated by the following formula (4) corresponding to formula (2) and is a value obtained by correcting the $\theta_{k-1}$ using the T. Since the T is calculated and set for each period $\Delta t$, the T in formula (4) is the T set in the period $\Delta t_{k-1}$.

$$\theta'_k = \{(T/\Delta t) \cdot (\theta_{k-1} - \theta_{k-2})\} + \theta'_{k-2} \quad \text{Formula (4)}$$

In this way, according to formulae (1) to (3), the adjustment parameters T and G of the temperature sensor 4A in the period $\Delta t1$ to $\Delta tn$ are calculated and stored in the memory 32 as illustrated in FIG. 3. While the calculation of the adjustment parameters T and G of the temperature sensor 4A has been representatively described above, the adjustment parameters T and G of the temperature sensors 4B, 4C and 4D are calculated according to formulae (1) to (3) in the same manner as the calculation of the adjustment parameters T and G of the temperature sensor 4A and are stored in the memory 32.

The aforementioned setting method of the adjustment parameters T and G is nothing more than one example. As an alternative example, the adjustment parameter G may be determined so that the detection temperature corrected by the adjustment parameter T of a time preceding the end time $t_k$ of the period $\Delta t_k$ is aligned to the standard temperature of the respective time. Specifically, the G may be set so that the detection temperature Q3 corrected using the adjustment parameter T is matched with the standard temperature Q2 of time Q1 between time $t_{k-1}$ and time $t_k$ illustrated in FIG. 13.

Figure 14:
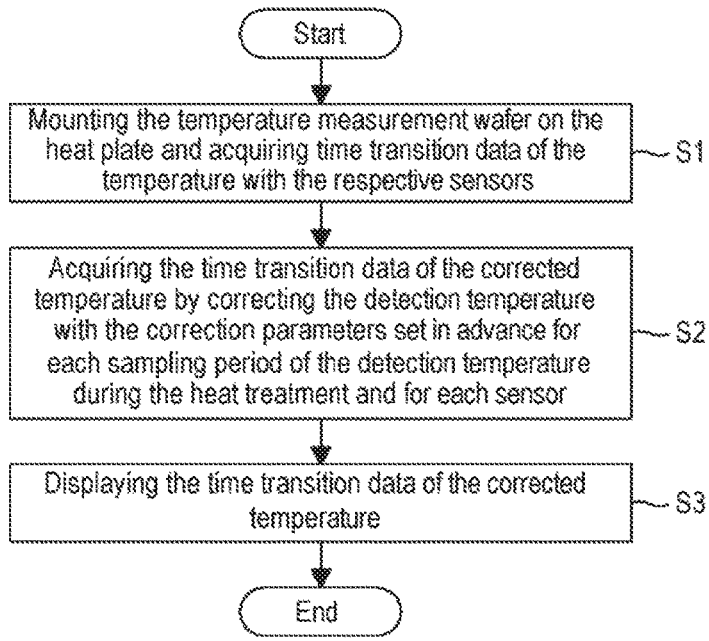
FIG. 14 is a flowchart illustrating a measurement procedure of the temperature of the heat plate after the parameter is set.

A measurement procedure using the temperature measurement device 20, which is performed after the adjustment parameters T and G are acquired as described above, will now be described with reference to a flowchart illustrated in FIG. 14. The temperature measurement wafer 2 is mounted on the heat plate 11 in a desired orientation and is subjected to a heat treatment. During the heat treatment, the detection signals from the temperature sensors 4A to 4D are sampled in each period $\Delta t$ and the time transition data of the detection temperatures are acquired (step S1). In this temperature measurement, unlike the setting process of the parameters described with reference to FIGS. 4 to 8, for the purpose of performing the temperature measurement at mutually different points of the heat plate 11, the detection signals of the respective temperature sensors 4A to 4D are acquired in parallel and the time transition data of the detection temperatures of the respective temperature sensors 4A to 4D are acquired.

Thereafter, detection temperatures in the time transition data thus acquired are corrected by the adjustment parameters T and G stored in the memory 32, in association with the temperature sensors 4 which have acquired the respective detection temperatures and timings at which the respective detection temperatures have been acquired, thereby preparing a time transition data of corrected temperatures (step S2). Specifically, a procedure of calculating the corrected temperature from the detection temperature $\theta_k$ acquired by the temperature sensor 4A at time $t_k$, will be described. First, $\theta'_k$ is calculated based on the aforementioned formula (2) using the temperature sensor 4A and the adjustment parameter T set in the period $\Delta t_k$ corresponding to time $t_k$. Thereafter, $\Theta_k$ is calculated by the aforementioned formula (3) using the temperature sensor 4A and the adjustment parameter G set in the period $\Delta t_k$. The $\Theta_k$ is determined as the corrected temperature of time $t_k$.

Figure 15:
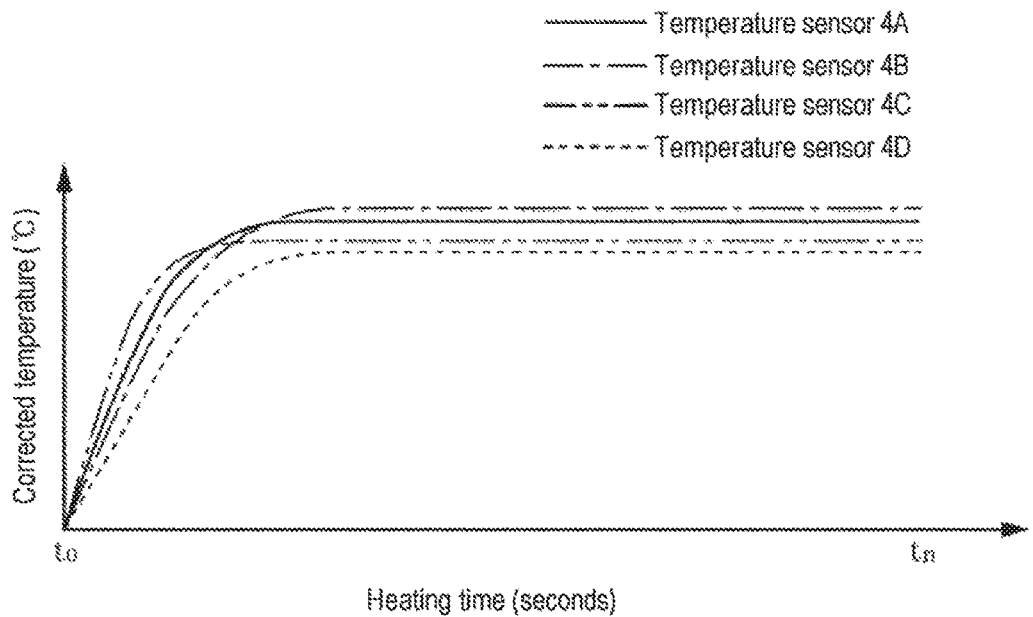
FIG. 15 is a graph illustrating one example of the transitions of the detection temperatures corrected by the parameter.

The time transition data of the corrected temperatures are displayed on the display part 34 of the measurement unit 3 for each temperature sensor 4 as a graph indicating the transition of the temperature of the substrate body 21 of the temperature measurement wafer 2, for example, as illustrated in FIG. 15 (step S3). In the graph of FIG. 15, similar to the graphs of FIGS. 11 and 12, the heating time is indicated in the horizontal axis and the corrected temperature is indicated in the vertical axis. As described above, the process temperature in the stable period of the graph corresponds to the temperature of the heat plate 11. A worker performs the adjustment and inspection of the output of the heaters 12 of the heat plate 11 with reference to the displayed time transition data. After the adjustment and inspection, a wafer W is mounted on the heat plate 11 and is subjected to a heat treatment.

According to the temperature measurement device 20, the detection temperatures acquired by the temperature sensors 4A to 4D are corrected using the adjustment parameters T and G set in advance for each period $\Delta t$, in which sampling is performed based on the time transition data of the respective detection temperatures of the temperature sensors 4A to 4D installed in the temperature measurement wafer 2, and for each temperature sensor 4. Thus, the time transition data of the corrected temperatures are acquired. The time transition data of the corrected temperatures accurately reflect the temperatures of the respective portions of the substrate body 21 in which the temperature sensors 4A to 4D are installed. Accordingly, it is possible to accurately perform the temperature adjustment of the heat plate 11.

In the example described above, the highest temperature among the detection temperatures of the temperature sensors 4A to 4D detected at time $t_k$ is set as the standard temperature. However, the standard temperature is not limited to the temperature set in this way. For example, an average value of the detection temperatures of the temperature sensors 4A to 4D detected at time $t_k$ may be set as the standard temperature at time $t_k$. However, since the highest temperature is close to the temperature of the substrate body 21 as described above, it is desirable that the highest temperature is set as the standard temperature. As another example, a temperature obtained by adding a predetermined value to the highest temperature may be set as the standard temperature, or a temperature obtained by adding a predetermined value to the aforementioned average value may be set as the standard temperature.

In the example described above, as for one of the temperature sensors 4, one set of adjustment parameters T and G is set for each period $\Delta t$ which is the time zone between the preceding and following sampling timings. However, the present disclosure is not limited to such setting of a set of the adjustment parameters T and G. For example, a set of the adjustment parameters T and G may be set for each m-multiple of the sampling interval (where m is an integer of two or more), namely for each m×$\Delta t$. In this case, assuming that the detection temperature detected by the temperature sensor 4 at arbitrary time $t_k$ as described above is $\theta_k$, $\theta_{k-m}$ to $\theta_{k-1}$ are corrected by a set of adjustment parameters T and G set in one time zone, $\theta_k$ to $\theta_{k+(m-1)}$ are corrected by reading out a set of adjustment parameters T and G set in a subsequent time zone. In other words, at step S2 of the flow illustrated in FIG. 14, the detection temperature is corrected m times by one set of adjustment parameters T and G.

In the meantime, the adjustment parameters T and G may be set for each process temperature of the wafer W and may be stored in the memory 32. Specifically, for example, the adjustment parameters T and G in the case where the process temperature is 100 degrees C., 110 degrees C. and 120 degrees C. are respectively acquired by the aforementioned method and are stored in the memory 32. That is to say, each time the output of the heaters 12 of the heat plate 11 is changed so as to obtain the process temperature, the temperature detection described with reference to FIGS. 4 to 7, the determination of the standard temperature described with reference to FIG. 8 and the calculation of the adjustment parameters T and G described with reference to FIG. 13 are performed. The adjustment parameters T and G thus calculated are stored in the memory 32 in association with the process temperature. Then, at step S1 of the flow described above, the temperature measurement wafer 2 is heated by allowing the heaters 12 to generate heat at a heating rate corresponding to the process temperature selected by a worker from 100 degrees C., 110 degrees C. and 120 degrees C. Then, at step S2, the detection temperatures are corrected by reading out the adjustment parameters T and G corresponding to the selected process temperature.

Each of the adjustment parameters T and G has a low-order dependence on the process temperature. Specifically, each of values of the adjustment parameters T and G can be expressed by a linear function or a quadratic function with respect to the process temperature. Accordingly, for example, in the case where the adjustment parameters T and G of the process temperature of 100 degrees C. and the adjustment parameters T and G of the process temperature of 110 degrees C. are calculated in the aforementioned manner, a correlation (first correlation) between the process temperature and the adjustment parameter T, and a correlation (second correlation) between the process temperature and the adjustment parameter G for each temperature sensor 4 and for each period $\Delta t$ are set and stored in the memory 32. Specifically, assuming that, as for the period $\Delta t_k$ of temperature sensor 4A, the adjustment parameter T at the process temperature of 100 degrees C. is T1 and the adjustment parameter T at the process temperature of 110 degrees C. is T2, the first correlation in the period $\Delta t_k$ of the temperature sensor 4A is acquired based on the T1 and T2. The first correlation and the second correlation are, for example, a linear function or a quadratic function with respect to the process temperature.

At step S1 of the aforementioned flow, the temperature measurement wafer 2 is assumed to be heated so that the process temperature becomes a temperature higher than 100 degrees C. and lower than 110 degrees C., for example, 105 degrees C. In this case, at step S2, the adjustment parameters T and G for the respective temperature sensors 4 and the respective periods Δt may be calculated from the first correlation and the second correlation set for each temperature sensor 4 and each period Δt and the process temperature (105 degrees C.) set as described above. Correction may be performed using the adjustment parameters T and G thus calculated.

The setting of the adjustment parameters T and G for each process temperature includes setting the adjustment parameters T and G for a first process temperature range and a second process temperature range. Specifically, for example, one group of adjustment parameters (the adjustment parameters for each temperature sensor 4 and each period Δt) may be set with respect to a process temperature range of 100 degrees C. or more and less than 110 degrees C., and another group of adjustment parameters may be set with respect to a process temperature range of 110 degrees C. or more and less than 120 degrees C. In other words, if the process temperature is 100 degrees C. and if the process temperature is 105 degrees C. one group of mutually identical adjustment parameters may be used. If the process temperature is 110 degrees C. and if the process temperature is 115 degrees C., another group of mutually identical adjustment parameters may be used.

The heat plate 11 described above may be applied to not only a heating module for performing PEB but also a heating module for forming a coating film by coating a coating solution such as a resist or the like on the surface of a wafer W and then drying the coating solution, or a heating module for supplying and heating a chemical solution for increasing the adhesion between a coating film and a wafer W before a coating solution is coated. Thus, the temperature measurement device 20 may be applied to the heat plate 11 that constitutes these heating modules.

Figure 16:
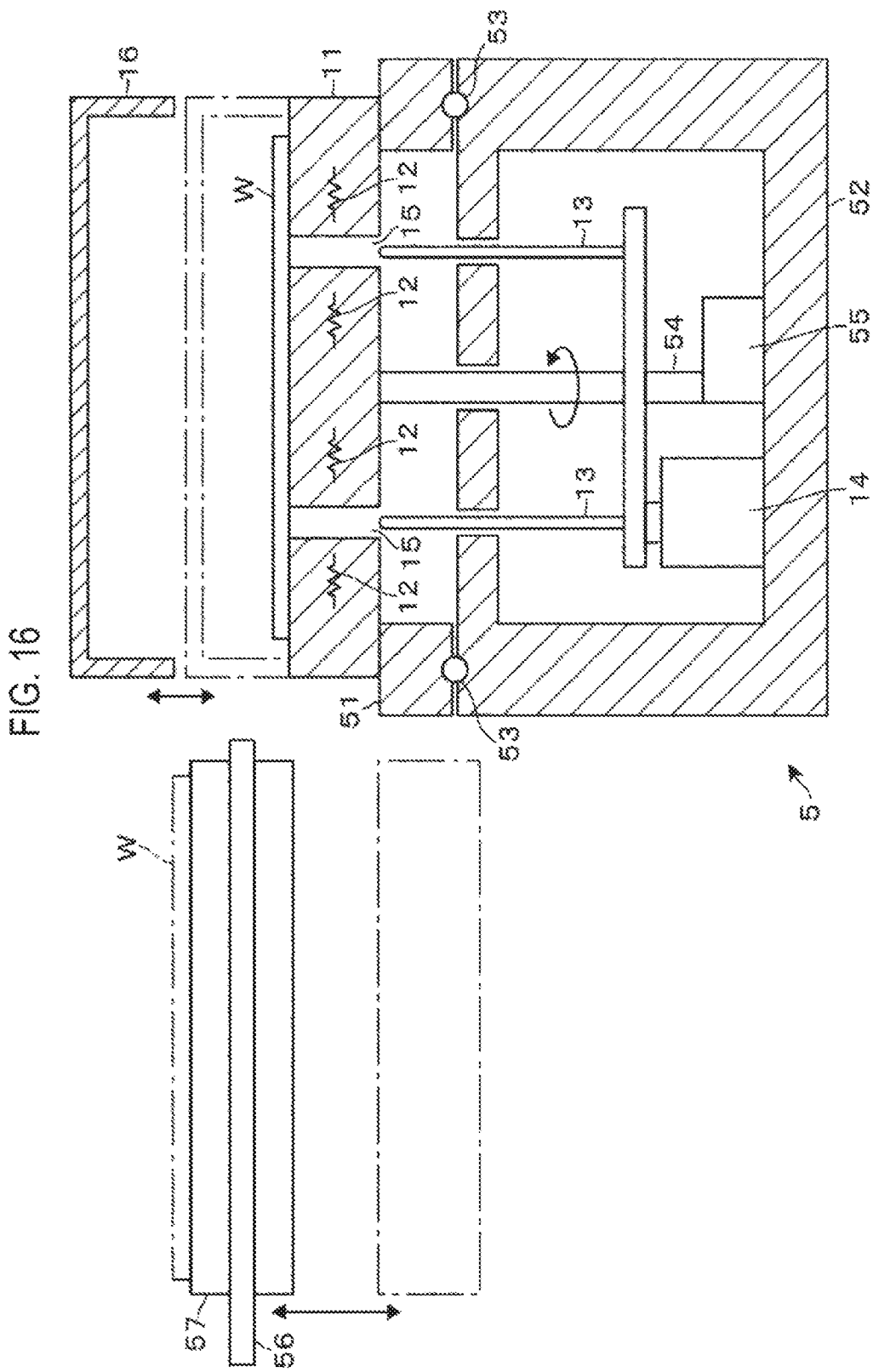
FIG. 16 is a vertical sectional side view of a heating module to which the temperature measurement device is applied.
Figure 17:
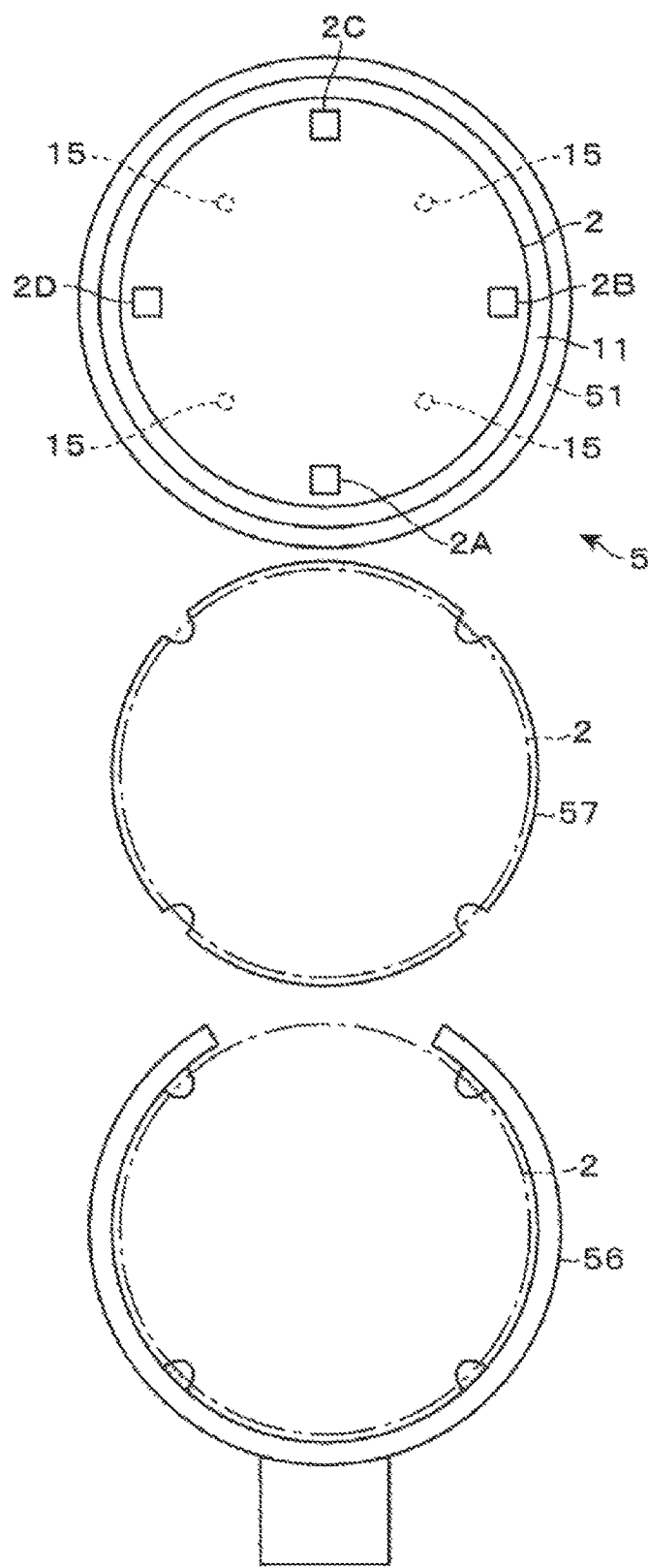
FIG. 17 is a plane view of the heating module.

Subsequently, a heating module 5 configured to automatically change an orientation of the temperature measurement wafer 2 with respect to the heat plate 11 described with reference to FIGS. 4 to 7 in order to acquire the adjustment parameters T and G, will be described using a vertical sectional side view of FIG. 16 and a plane view of FIG. 17. In FIGS. 16 and 17, reference numeral 51 designates a support ring configured to support a peripheral edge portion of a rear surface of the heat plate 11. In FIGS. 16 and 17, reference numeral 52 designates a base installed under the support ring 51 through a thrust bearing 53. In FIGS. 16 and 17, reference numeral 54 designates a rotary shaft extending from a central portion of the rear surface of the heat plate 11 toward a base 52. In FIGS. 16 and 17, reference numeral 55 designates a rotary drive part installed in the base 52 and configured to rotate the rotary shaft 54 about an axis. With the rotation of the rotary shaft 54, the support ring 51 and the heat plate 11, which are integrally formed with the rotary shaft 54, are rotated in the circumferential direction thereof, whereby the orientation is changed. The heat plate 11 has, for example, four holes 15 so that the lift pins 13 can pass through the respective holes 15 even when the orientation of the heat plate 11 is changed as will be described later.

In FIGS. 16 and 17, reference numeral 56 designates a transfer mechanism configured to transfer the wafer W or the temperature measurement wafer 2 while supporting the rear surface of the wafer WV or the temperature measurement wafer 2 and capable of moving toward and away from the heat plate 11. In FIGS. 16 and 17, reference numeral 57 designates a horizontal cooling plate provided with a cooling water flow path (not shown) and configured to cool the wafer W or the temperature measurement wafer 2 mounted thereon. When the heating module 5 is seen in a plane view, the cooling plate 57 is installed in a movement path of the transfer mechanism 56. The cooling plate 57 is configured to be moved up and down by an elevator mechanism (not shown). Thus, the cooling plate 57 can deliver the wafer W or the temperature measurement wafer 2 with respect to the transfer mechanism 56. Alternatively, such a delivery may be performed by moving the transfer mechanism 56 up and down instead of the cooling plate 57.

Figure 5:
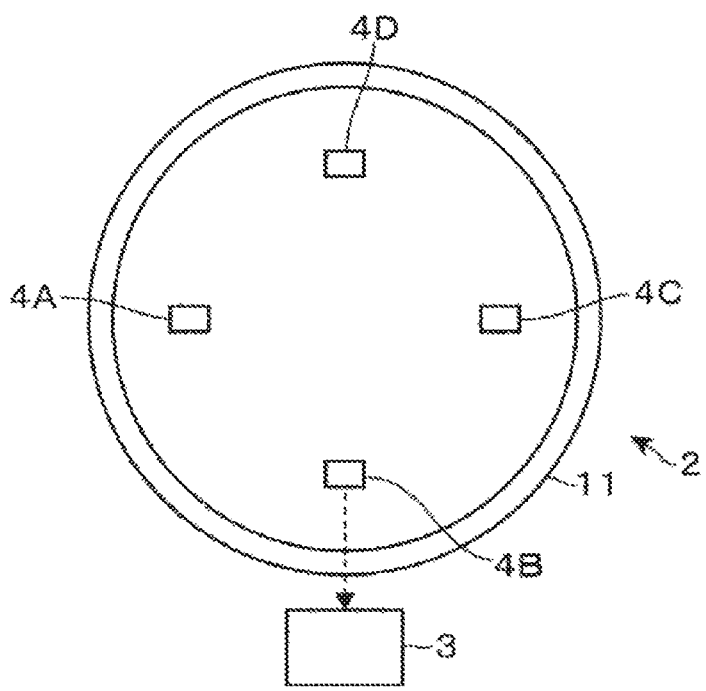
FIG. 5 is an explanatory view illustrating a state in which the temperature measurement wafer is mounted on the heat plate.
Figure 6:
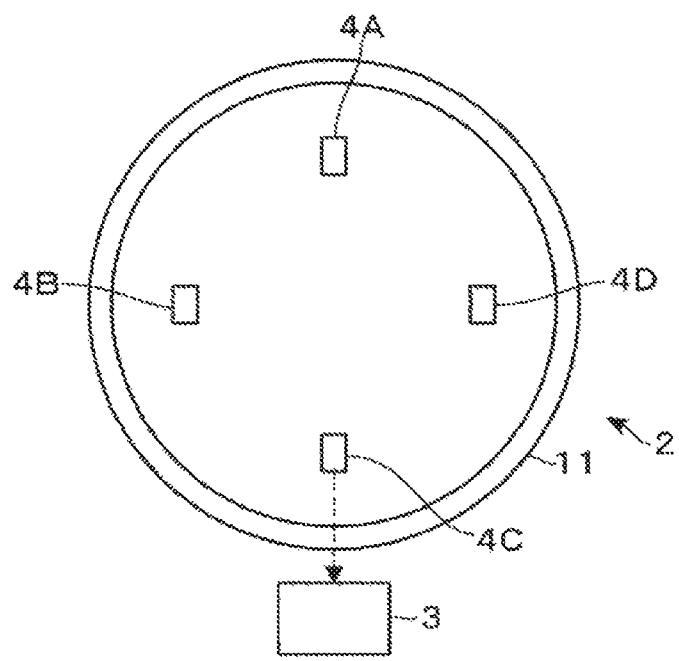
FIG. 6 is an explanatory view illustrating a state in which the temperature measurement wafer is mounted on the heat plate.
Figure 7:
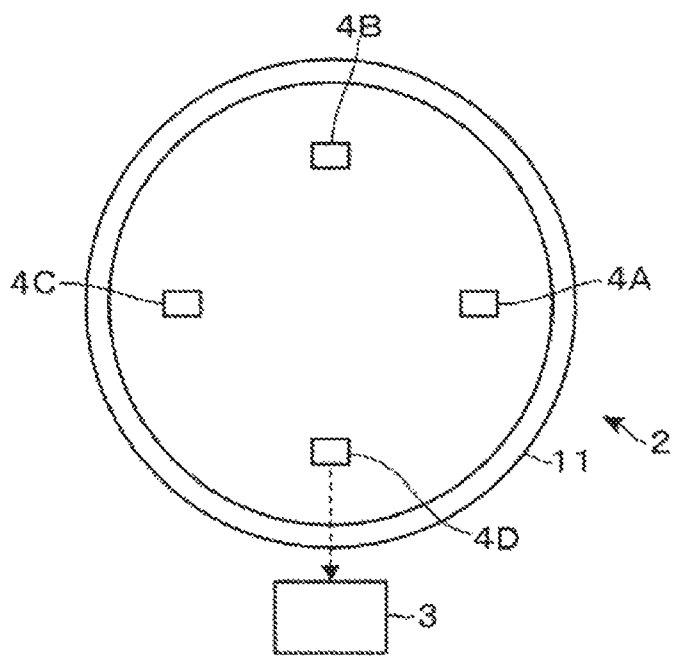
FIG. 7 is an explanatory view illustrating a state in which the temperature measurement wafer is mounted on the heat plate.

The temperature measurement wafer 2 is mounted on the heat plate 11 by the transfer mechanism 56 and the lift pins 13 and is subjected to a heat treatment. Then, the detection signal of the temperature sensor 4A is acquired. That is to say, the first temperature detection described with reference to FIG. 4 is performed. Thereafter, the temperature measurement wafer 2 is transferred to the cooling plate 57 by the transfer mechanism 56 and the lift pins 13 and is cooled by the cooling plate 57. The heat plate 11 is rotated so that the orientation thereof is changed by 90 degrees. The temperature measurement wafer 2 thus cooled is mounted on the heat plate 11 again by the transfer mechanism 56 and the lift pins 13. As the heat plate 11 is rotated as described above, the temperature sensor 4B is positioned at the point where the temperature sensor 4A was positioned on the heat plate 11 at the first temperature detection as illustrated in FIG. 5. Then, the second temperature detection is performed. Thereafter, with the rotation of the heat plate 11, the orientation of the temperature measurement wafer 2 with respect to the heat plate 11 is changed, and the third and fourth temperature detections described with reference to FIGS. 6 and 7 are performed.

According to the present disclosure in some embodiments, a temperature measurement substrate provided with a plurality of temperature sensors is mounted on a heat plate. Thereafter, individual temperature detection values sampled at predetermined time intervals are corrected using correction parameters corresponding to multiple time zones after the temperature sensors and the temperature measurement substrate are mounted on the heat plate, thereby acquiring time transition data of a temperature. The correction parameters are calculated based on standard temperature transition data acquired in advance using the temperature sensors and temperature transition data of each of the temperature sensors. This configuration makes it possible to increase the accuracy of the time transition data of a temperature thus acquired.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A device that measures a temperature of a heat plate configured to heat a target substrate mounted thereon, the device comprising:

a temperature measurement substrate including a substrate body and a plurality of temperature sensors installed in the substrate body;
a heating module configured to change an orientation of the temperature measurement substrate mounted on the heat plate;
a memory part to, for each of the plurality of temperature sensors, store correction parameters over a plurality of time zones after the temperature measurement substrate is mounted on the heat plate; and
a data processing part configured to acquire time transition data of a temperature by correcting respective temperature detection values sampled at predetermined time intervals after the temperature measurement substrate is mounted on the heat plate, using the correction parameters stored in the memory part in a corresponding relationship with the plurality of temperature sensors and the plurality of time zones,
wherein the correction parameters are obtained in advance based on a standard temperature transition data acquired in advance using the plurality of temperature sensors and a time transition data acquired by each of the plurality of temperature sensors,
wherein the heating module is further configured to set an adjustment temperature based on the acquired time transition data, and
wherein the correction parameters include an adjustment parameter T corresponding to a time delay and an adjustment parameter G corresponding to a gain, and a temperature detection value Θ corrected by the correction parameters is obtained by a following formula:

$$\Theta_k = G \cdot \theta_k'$$

$$\theta_k' = \{(T/\Delta t) \cdot (\theta_k - \theta_{k-1})\} + \theta'_{k-1}$$

where θ is a temperature detection value of each of the plurality of temperature sensors, θ' is a value of an intermediate correction step of the temperature detection value, Δt is a sampling period, k is a certain sampling time, and k−1 is a sampling time just earlier than a kth sampling time.

2. The device of claim 1, wherein each of the plurality of time zones in which the correction parameters are determined, corresponds to a time zone between preceding and following sampling timings after the temperature measurement substrate is mounted on the heat plate.

3. The device of claim 1, wherein the correction parameters are set for each process temperature which is a temperature reached when the target substrate is mounted on the heat plate.

4. The device of claim 1, wherein the standard temperature transition data is a highest temperature among temperatures respectively detected by the plurality of temperature sensors in each of the plurality of time zones in which the correction parameters are determined.

5. The device of claim 1, wherein the standard temperature transition data is an average value of temperatures respectively detected by the plurality of temperature sensors in each of the plurality of time zones in which the correction parameters are determined.

6. A method of measuring a temperature of a heat plate configured to heat a target substrate mounted thereon, comprising:
mounting a temperature measurement substrate, which includes a substrate body and a plurality of temperature sensors installed in the substrate body, on the heat plate;
changing, by a heating module, an orientation of the temperature measurement substrate mounted on the heat plate;
acquiring, for each of the plurality of temperature sensors, correction parameters over a plurality of time zones after the temperature measurement substrate is mounted on the heat plate, based on a standard temperature transition data acquired using the plurality of temperature sensors and a time transition data acquired by each of the plurality of temperature sensors;
acquiring a time transition data of a temperature by correcting respective temperature detection values sampled at predetermined time intervals after the temperature measurement substrate is mounted on the heat plate, using the correction parameters corresponding to the plurality of temperature sensors and the plurality of time zones; and
setting, by the heating module, an adjustment temperature based on the acquired time transition data,
wherein the correction parameters include an adjustment parameter T corresponding to a time delay and an adjustment parameter G corresponding to a gain, and a temperature detection value Θ corrected by the correction parameters is obtained by a following formula:

$$\Theta_k = G \cdot \theta_k'$$

$$\theta_k' = \{(T/\Delta t) \cdot (\theta_k - \theta_{k-1})\} + \theta'_{k-1}$$

where θ is a temperature detection value of each of the plurality of temperature sensors, θ' is a value of an intermediate correction step of the temperature detection value, Δt is a sampling period, k is a certain sampling time, and k−1 is a sampling time just earlier than a kth sampling time.

* * * * *